United States Patent [19]
Blakely et al.

[11] Patent Number: 5,260,379
[45] Date of Patent: Nov. 9, 1993

[54] POLYESTER BLENDS WITH IMPROVED PROCESSABILITY

[75] Inventors: Dale M. Blakely; Robert W. Seymour, both of Kingsport, Tenn.

[73] Assignee: Eastman Kodak Company, Rochester, N.Y.

[21] Appl. No.: 759,338

[22] Filed: Sep. 13, 1991

[51] Int. Cl.$^5$ ................. C08L 25/14; C08L 67/02
[52] U.S. Cl. ................................. 525/173; 525/176
[58] Field of Search .......................... 525/173, 176

[56] References Cited

U.S. PATENT DOCUMENTS

| | | | |
|---|---|---|---|
| 3,047,539 | 7/1962 | Pengilly | 260/75 |
| 3,290,411 | 12/1966 | Tsuji et al. | 260/873 |
| 3,728,212 | 4/1973 | Caldwell et al. | 161/182 |
| 4,256,681 | 3/1981 | Lindmayer | 264/85 |
| 4,539,290 | 9/1985 | Mumaw | 430/569 |
| 4,985,501 | 1/1991 | Udipi | 525/173 |

Primary Examiner—Patricia A. Short
Attorney, Agent, or Firm—Betty J. James; William P. Heath, Jr.

[57] ABSTRACT

This invention relates to an injection molding composition having a melt viscosity lower than about 2000 poise at 1500/sec. shear rate at a temperature of about 275° C., and an excellent stiffness of at least 200,000 psi, comprising:
from about 10 to about 90% of a polyester comprising repeat units from terephthalic acid, ethylene glycol, and 1,4-cyclohexanedimethanol, and
from about 10 to about 90% styrene copolymer comprising repeat units from about 5 to about 35 mole percent of methyl methacrylate.

6 Claims, 8 Drawing Sheets

POLYESTER BLENDS WITH IMPROVED PROCESSABILITY

FIELD OF THE INVENTION

This invention relates to blends of a polyester and a styrene methyl methacrylate copolymer.

BACKGROUND OF THE INVENTION

Thermoplastic polymers have many desirable properties that make them useful in injection molding applications. Some of these desirable properties include strength, toughness, heat resistance, and resistance to chemicals.

One problem with polyesters in injection molding applications is that it is sometimes difficult to fill large molds requiring long flow lengths or very thin parts because of the high melt viscosity of the polymer. A solution to this problem is to raise the temperature of the polymer melt, thus lowering its viscosity. This solution is often not satisfactory for polyester polymers since polyesters tend to degrade, or lose molecular weight, at elevated processing temperatures.

Also, there are well known additives which reduce the melt viscosity of polyesters. However, these additives usually make the resulting molded material less rigid, less heat resistant, and/or function only by breaking down the molecular weight of the polyester.

In U.S. Pat. No. 3,728,212, issued on Apr. 17, 1973, hot melt adhesive compositions which consist of a blend of poly(tetramethylene terephthalate) with polystyrene or a polystyrene copolymer are disclosed. No other uses for these blends are disclosed.

Also, U.S. Pat. No. 3,290,411 describes methods of making blends principally with styrene polymers and conversion of the blends into fibers.

However, the prior art does not show the desirability of using blends of a polyester and a styrene methyl methacrylate copolymer in injection molding applications.

SUMMARY OF THE INVENTION

The problems noted above are overcome with the injection molding compositions of this invention having a melt viscosity lower than about 2000 poise at 1500/sec. shear rate at a temperature of about 275° C., and an excellent stiffness of at least 200,000 psi, comprising:

from about 10 to about 90% of a polyester comprising repeat units from terephthalic acid, ethylene glycol, and 1,4-cyclohexanedimethanol, and from about 10 to about 90% styrene copolymer comprising repeat units from about 5 to about 35 mole percent of methyl methacrylate.

The compositions of the invention are advantageous in that they have a surprisingly low melt viscosity, excellent stiffness and heat resistance.

DETAILED DESCRIPTION OF THE PREFERRED EMBODIMENTS

The invention comprises blends of a polyester and a styrene-methyl methacrylate copolymer.

More particularly, the invention is directed to an injection molding composition having a melt viscosity lower than about 2000 poise at 1500/sec. shear rate at a temperature of about 275° C., and an excellent stiffness of at least 200,000 psi, comprising:

from about 10 to about 90% of a polyester comprising repeat units from terephthalic acid, ethylene glycol, and 1,4-cyclohexanedimethanol, and from about 10 to about 90% styrene copolymer comprising repeat units from about 5 to about 35 mole percent of methyl methacrylate.

The glycol comprises about 15 to about 85 mole percent of ethylene glycol. The remainder is preferably cyclohexanedimethanol. The glycol may also contain minor amounts of glycols such as 1,4-butanediol, 1,5-pentanediol, 1,6-hexanediol, neopentyl glycol(2,2-dimethyl 1,3-propanediol), 2,2,4,4-tetramethyl-1,3-cyclobutanediol and the like.

The dicarboxylic acid component may contain up to about 10 mol % of other conventional aromatic, aliphatic or alicyclic dicarboxylic acids such as isophthalic acid, naphthalenedicarboxylic acid, cyclohexanedicarboxylic acid, succinic acid, sebacic acid, adipic acid, glutaric acid, azelaic acid and the like.

The polyester portion of the molding compositions of the present invention is prepared by conventional polycondensation procedures well known in the art. Examples of these processes can be found in U.S. Pat. Nos. 4,256,861, 4,539,390, and 3,047,539 and include preparation by direct condensation or by ester interchange. Preferably, the polyesters are prepared by ester interchange which, in brief, involves first reacting the dicarboxylic acid with an alcohol to form a diester, such as dimethyl terephthalate. The diester is then ester-interchanged with a diol to form a bis ester, such as bis 2-hydroxyethyl terephthalate, which is condensed at low pressure and high temperature to form the polyester. The condensation reaction is allowed to continue until a desired inherent viscosity (I.V.) is obtained.

Preferably, the polyester portion is copoly (25-35/-75-65 1,4-cyclohexylenedimethylene/ethylene) terephthalate or copoly (58-68/42-32 1,4-cyclohexylenedimethylene/ethylene) terephthalate.

The polyester portion of the invention has an inherent viscosity of from about 0.5 to about 1.0 dl/g. It preferably has an inherent viscosity of from about 0.7 to about 0.8 dl/g.

The inherent viscosities (I.V.) of the polyesters herein are determined according to ASTM D2857-70 procedure in a Wagner Viscometer of Lab Glass, Inc. of Vineland, N.J. having a 178 ml capillary bulb, using a polymer concentration of 0.5% by weight in 60/40 by weight phenol/tetrachlorethane solvent. The procedure comprises heating the polymer/solvent system at 120° C. for 15 minutes to enhance dissolution of the polymer, cooling the solution to 25° C. and measuring the time of flow at 25° C. The I.V. is calculated from the equation $$(\eta) = \frac{\ln\left(\frac{t_s}{t_o}\right)}{C}$$

where:
$(\eta)$ = inherent viscosity at 25° C. at a polymer concentration of 0.5 g/100 mL of solvent;
ln = natural logarithm;
$t_s$ = sample flow time;
$t_o$ = solvent-blank flow time; and
C = concentration of polymer in grams per 100 mL of solvent = 0.50.

While this invention is directed primarily towards copolyester in blends with the styrene copolymer, it also possible to use copolyester based blends (such as those with polycarbonate) to blend with the styrene copolymer.

A thermoplastic polyester is defined herein as a polyester that can be formed by heat. Even when the final form has been assumed by applying heat, the original material can be reformed. Thermoplastic materials soften upon heating without destruction of the polyester. It can then be pressed, molded, extruded or cast into a desired shape into which it solidifies upon cooling. The softening and hardening processes are relatively fast so that the article can be molded, hardened by cooling and ejected from the mold in a matter of seconds rather than minutes.

The blends may be melt blended and injection molded on conventional processing equipment. The resulting blends possess surprising low melt viscosities which would also make them useful in certain molding applications which require the filling of long or thin parts.

The compositions of the invention can optionally contain reinforcing materials such as glass fibers, metal fibers, graphite fibers, aramid fibers, glass beads, aluminum silicate, asbestos, mica, talc, and the like and may be used in combination with, or in place of glass fibers. These reinforcing materials are present in the invention in a reinforcing amount. The reinforcing amount normally ranges from about 5% to 50% by weight of the total composition for each, the total reinforcing material less that 75% of the compositions. Preferably, the amount of each is in the range of about 10% to 30% by weight of the total composition. Glass fibers is the preferred reinforcing material. The glass fibers may be introduced into the composition as chopped glass fibers or continuous glass fiber rovings. Such fibers normally have a diameter of about 5-50 microns. Introduction of the glass fibers can be effected at any time during the blending operation, and preferably the glass fibers and the polyesters are blended together at the same time. They may also be added during the preparation of the polymers. This is done only in those cases where the polymerization reaction is not adversely affected.

Mica is a flake material and is commercially available. Diameter may vary between about 50 microns and about 1000 microns. Preference is given to use of muscovite micas over the use of phlogophite micas.

The compositions of this invention are prepared by blending the components together by any convenient means to obtain an intimate blend. For example the polyester can be mixed dry in any suitable blender or tumbler with the other components and the mixture melt extruded. The extrudate can be chopped. If desired, the reinforcing material can be omitted initially and added after the first melt extrusion, and the resulting mixture can then be melt extruded. The product is especially suitable as an injection molding composition for producing molded articles.

The compositions may also contain colorants, plasticizers, extenders, lubricants, oxidation inhibitors, stabilizers, impact modifiers, mold releases, and flame retardants, and inert fillers such as talc, calcium carbonate, silica, ultraviolet light stabilizers, heat stabilizers, and the like, which are compatible with the components of the blend and do not distort the usefulness of the final products. These additives are added in amounts known in the art to effect desired improvements in properties.

The following examples are for illustrative purposes only, and not to limit the scope of the invention. All percentages are by weight, unless otherwise specified.

PETG 6763 or Copoly(31/69 1,4-cyclohexylene dimethylene/ethylene terephthalate) and PCTG 5445 or Copoly(62/38 1,4-cyclohexylene dimethylene/ethylene terephthalate) are commercial polyesters produced by Eastman Chemical Company and are used in injection molding applications. NAS-10, NAS-21, and NAS-30 are commercially available styrene methyl methacrylate copolymers produced by Polysar which contain about 8%, 17%, and 26% methyl methacrylate, respectively, on a mole basis. Their glass transition temperatures range from about 100° C. to about 115° C.

EXAMPLE 1

Figure 1:
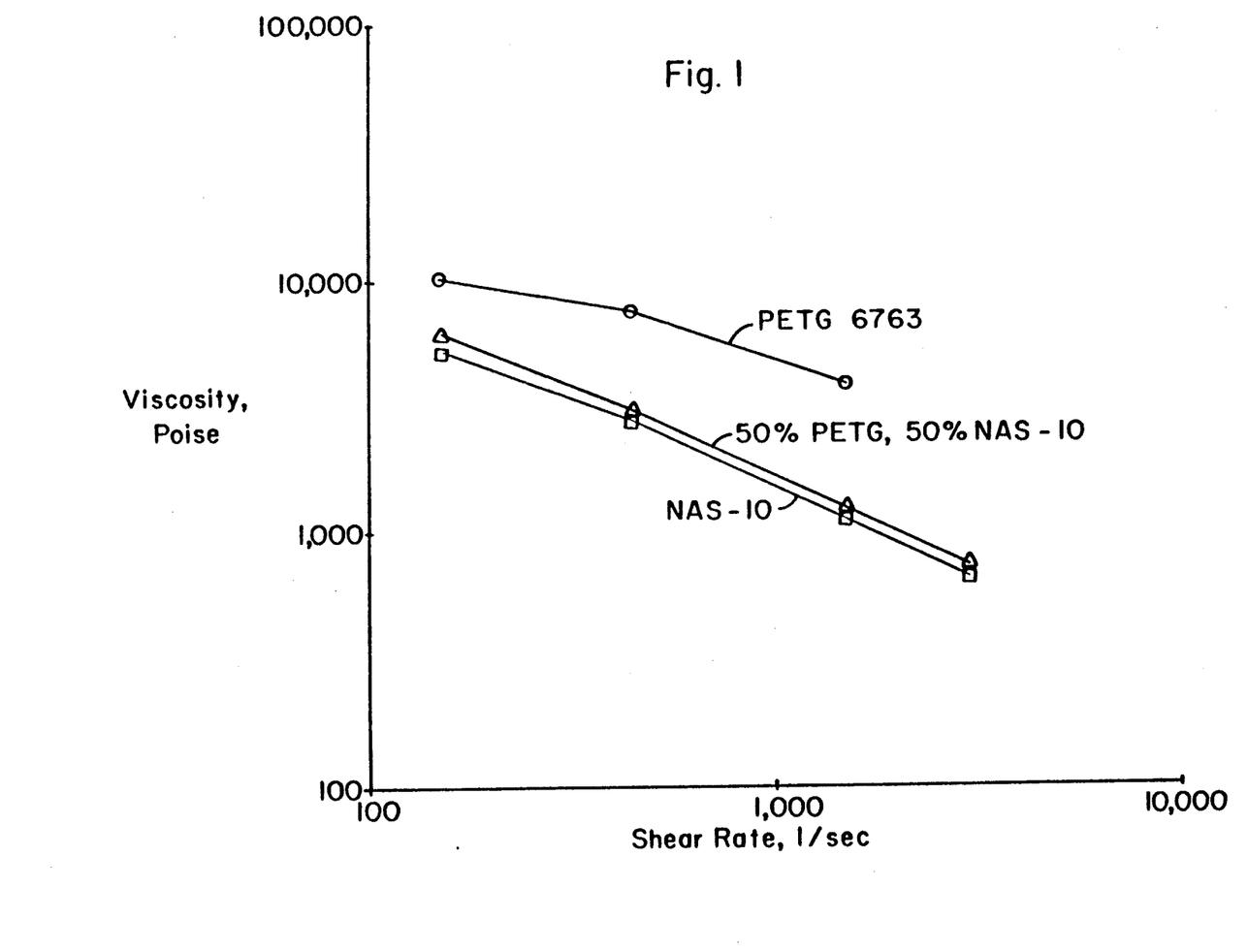
FIG. 1—a graphical representation of viscosity vs. shear rate for PETG and commercially available styrene-methyl methacrylate copolymers as represented in Table 1.
Figure 2:
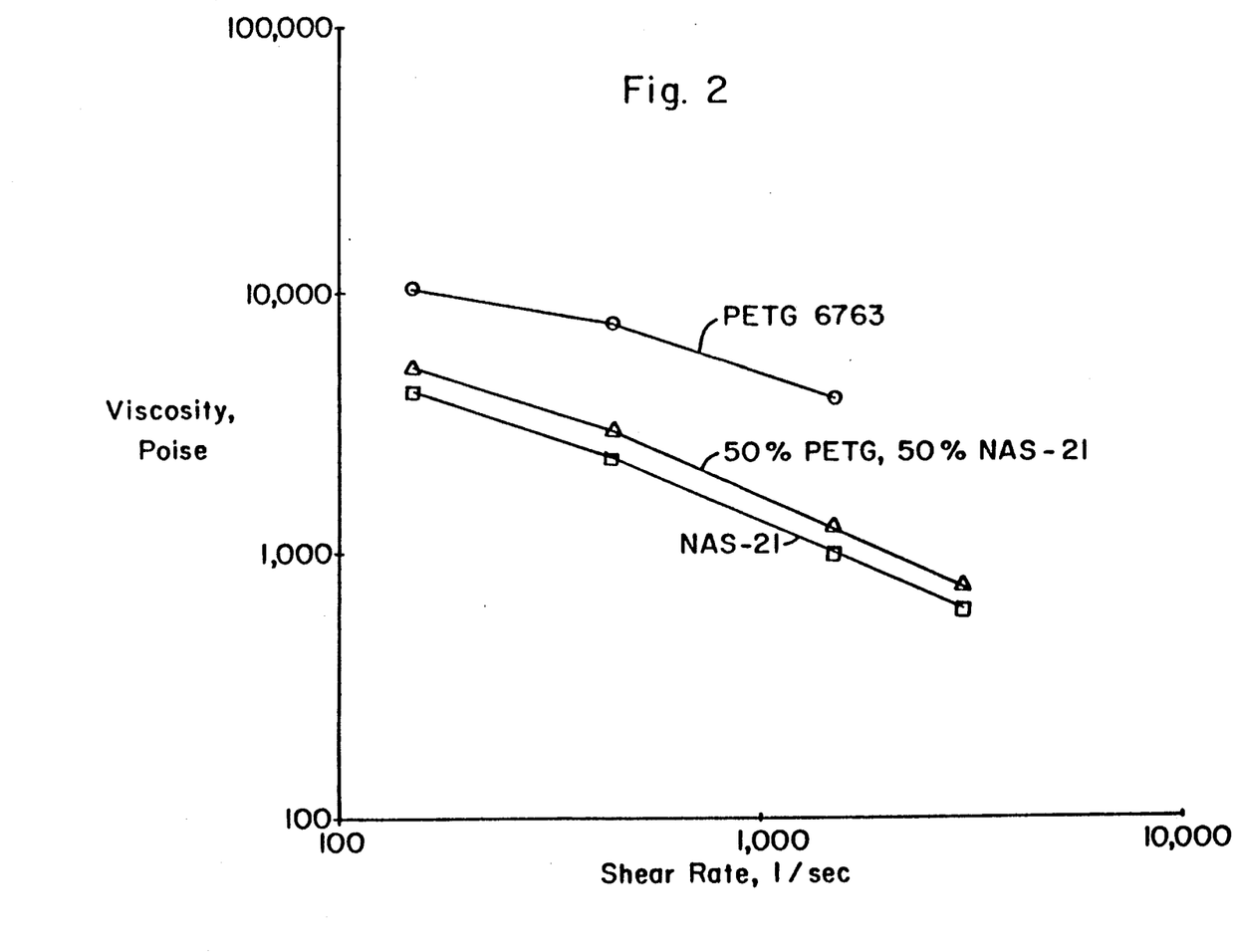
FIG. 2—a graphical representation of viscosity vs. shear rate for PETG and commercially available styrene-methyl methacrylate copolymers as represented in Table 1.
Figure 3:
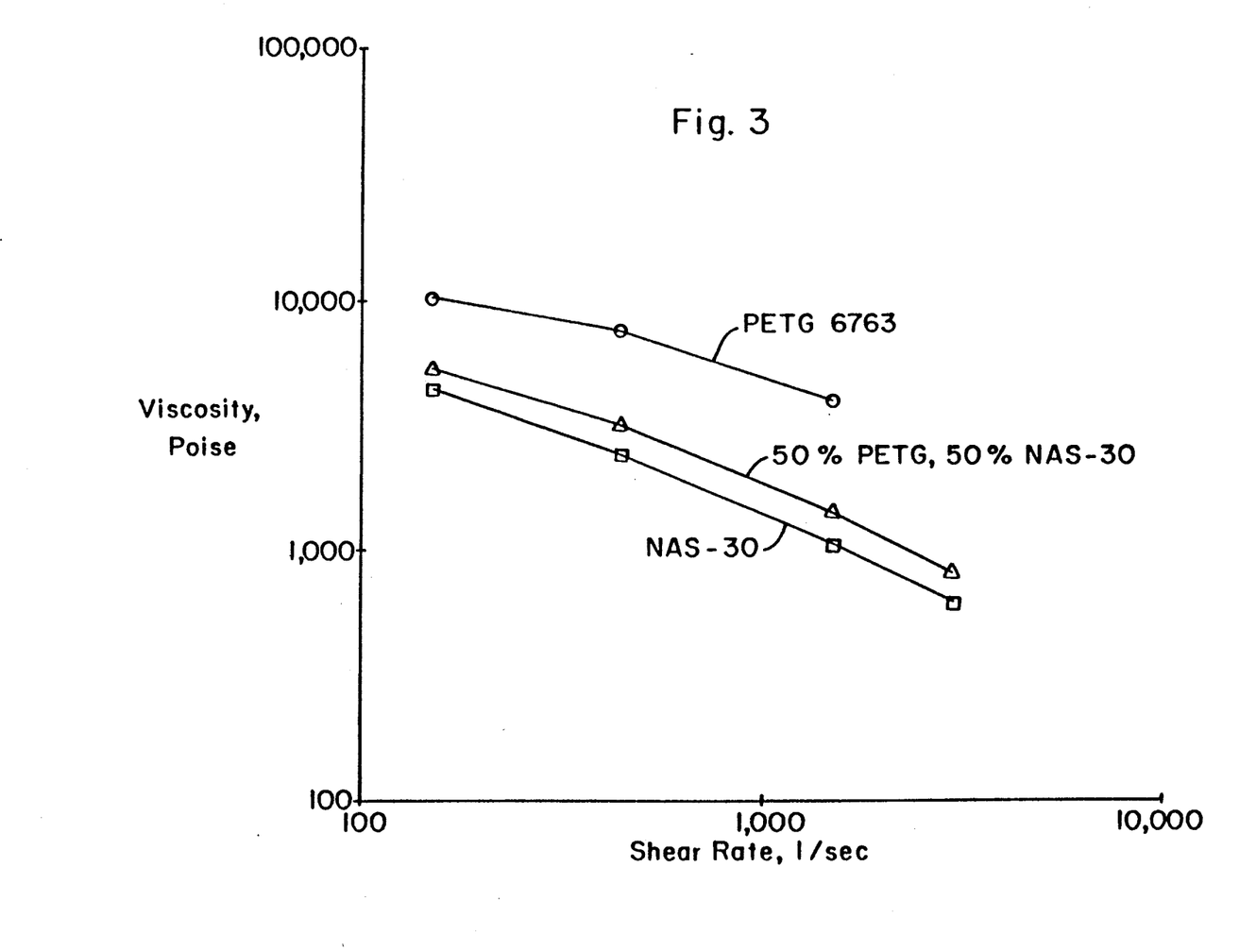
FIG. 3—a graphical representation of viscosity vs. shear rate for PETG and commercially available styrene-methyl methacrylate copolymers as represented in Table 1.

PETG 6763 was blended with equal weights of NAS-10, NAS-21, and NAS-30. The blends were compounded on a 1-¼" Sterling single screw extruder at 240° C. The melt viscosities at 245° C. of these blends and of the neat components were determined using an Instron capillary melt rheometer. The results are shown in Table 1 and FIGS. 1, 2, and 3. In all cases, the viscosities of the blends are nearly the same as the styrene copolymer component, even though the blend contains 50% copolyester. This is an unexpected result.

EXAMPLE 2

Figure 4:
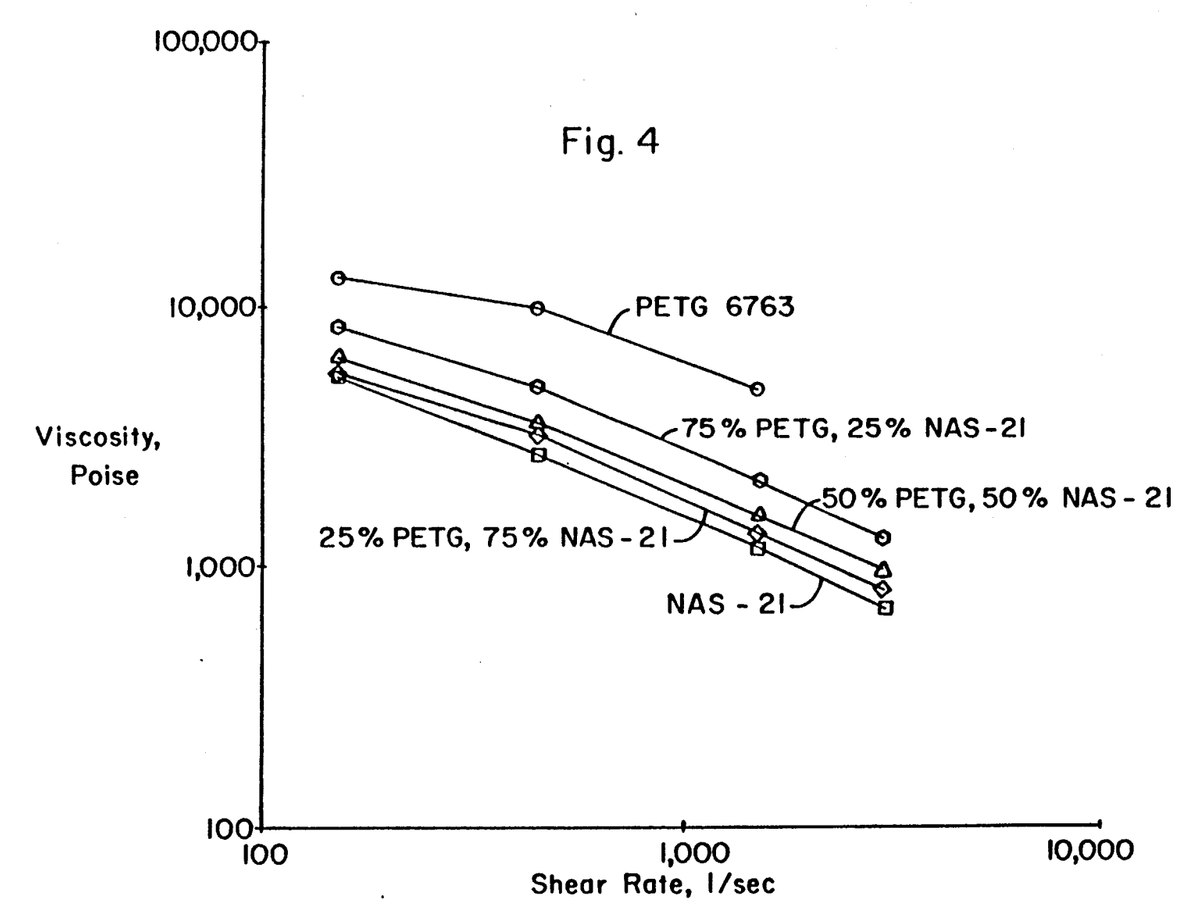
FIG. 4—a graphical representation of viscosity vs. shear rate for PETG and commercially available styrene-methyl methacrylate copolymers as represented in Table 2.

Blends of PETG 6763 and NAS-21 containing 25, 50, and 75 weight percent PETG were compounded and their melt viscosities determined as in Example 1. Those results are shown in Table 2 and FIG. 4. These results confirm the results found in Example 1 and show that the surprisingly low melt viscosities, typical of the styrene copolymer, of these blends extend over a wide range of compositions.

EXAMPLE 3

Figure 5:
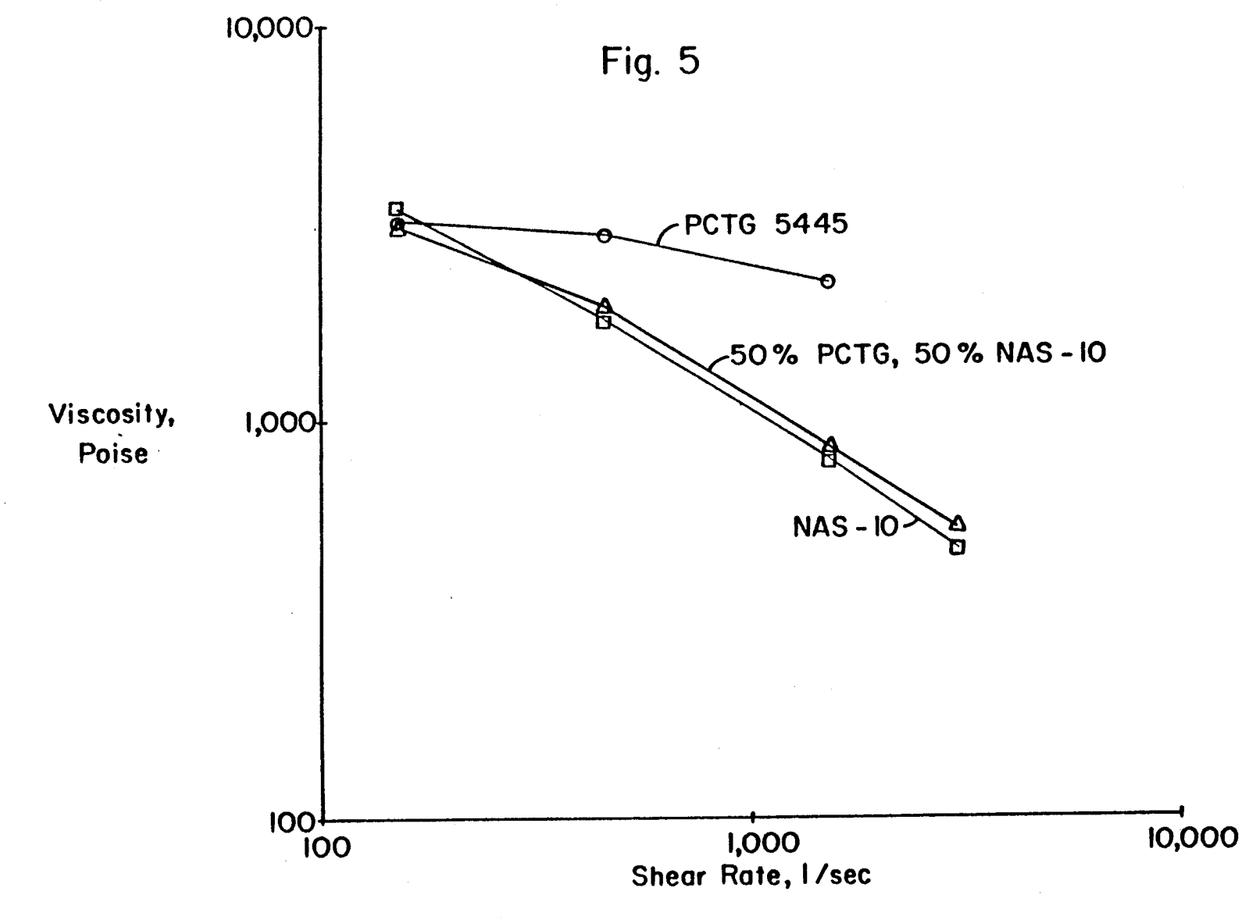
FIG. 5—a graphical representation of viscosity vs. shear rate for PETG and commercially available styrenemethyl methacrylate copolymers as represented in Table 3.
Figure 6:
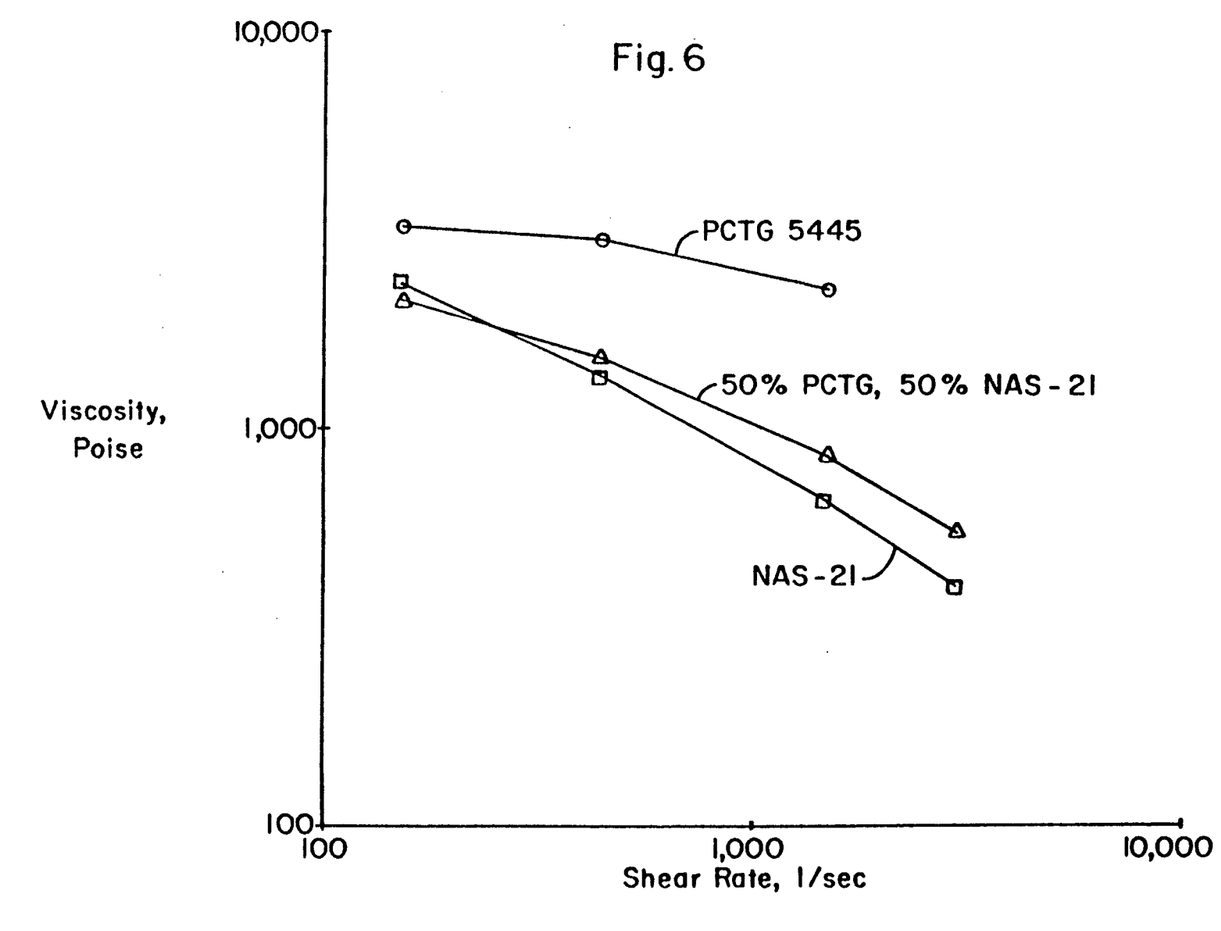
FIG. 6—a graphical representation of viscosity vs. shear rate for PCTG and commercially available styrene-methyl methacrylate copolymers as represented in Table 3.
Figure 7:
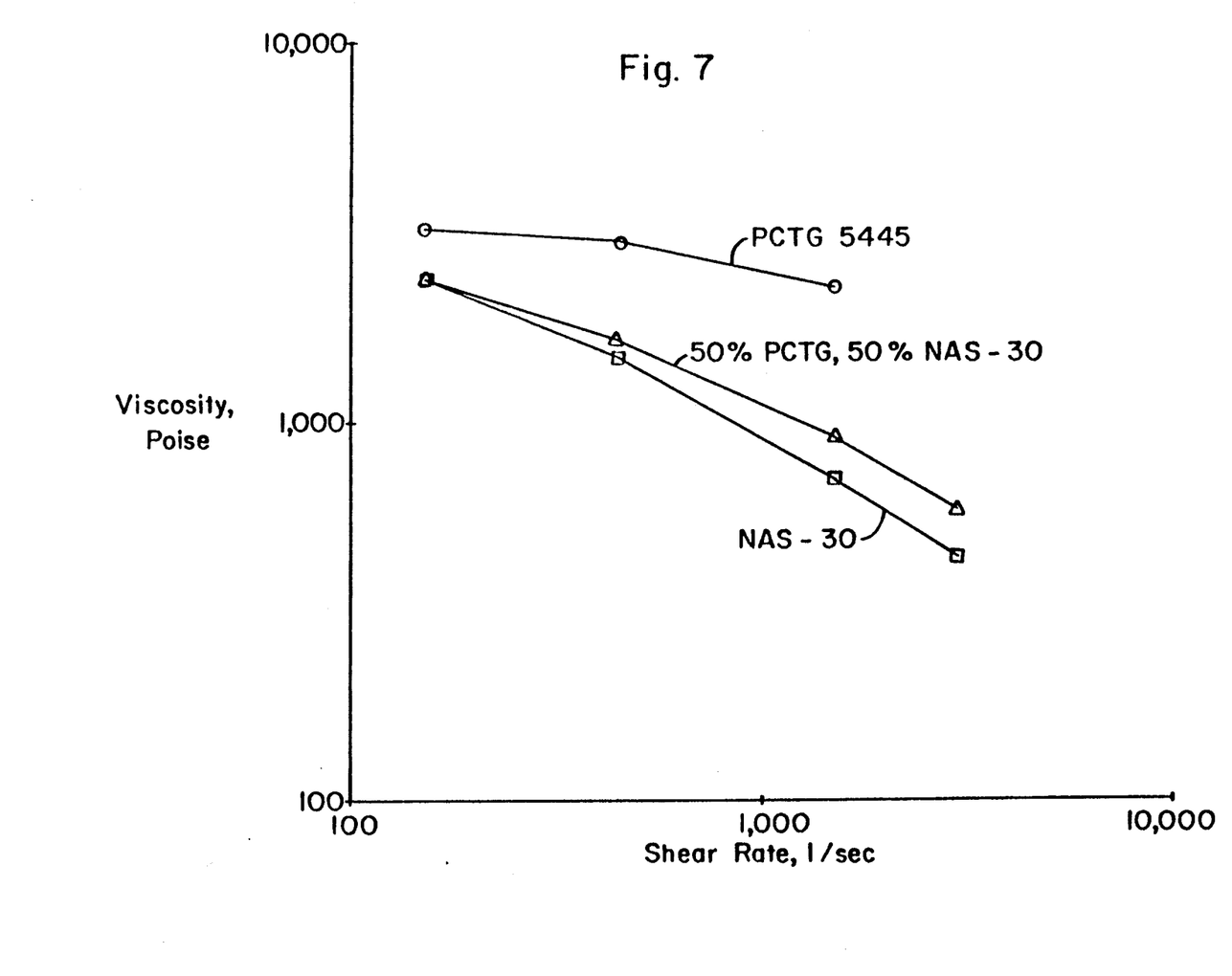
FIG. 7—a graphical representation of viscosity vs. shear rate for PCTG and commercially available styrene-methyl methacrylate copolymers as represented in Table 3.

PCTG 5445 was blended with equal weights of NAS-10, NAS-21, and NAS-30. The blends were compounded at 255° C. and their melt viscosities, along with those of the neat components, determined at 275° C. using the equipment described in Example 1. Those results are shown in Table 3 and FIGS. 5, 6, and 7. Unexpectedly, the viscosities of the blends are again very close to the viscosity of the unmodified styrene copolymer, despite the high level of copolymer in the blend.

EXAMPLE 4

Figure 8:
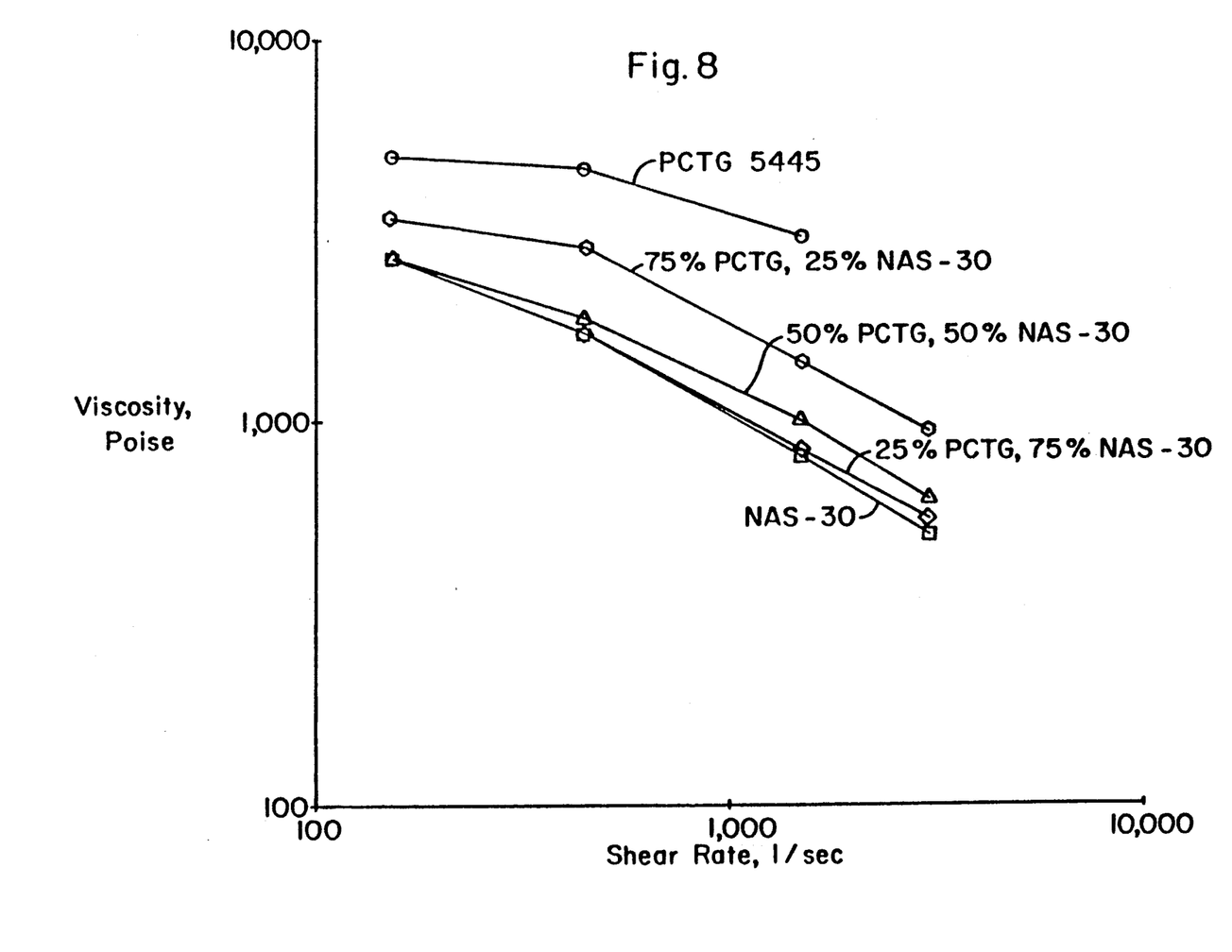
FIG. 8—a graphical representation of viscosity vs. shear rate for PCTG and commercially available styrene-methyl methacrylate copolymers as represented in Table 4.

Blends of PCTG 5445 and NAS-30 containing 25, 50, and 75 weight percent PCTG were compounded and their melt viscosities determined as in Example 3. Those results are shown in Table 4 and FIG. 8. The results of Example 3 show that blends of PCTG 5445, like PETG 6763, with the styrene methyl methacrylate copolymers have surprisingly low melt viscosities.

Table 5 shows the heat deflection temperatures and flexural moduli of the blends of Examples 2 and 4.

The blends containing the styrene copolymer have excellent heat resistance and stiffness compared to the neat copolyesters.

The unexpectedly low melt viscosities of these blends should allow them to be used in injection molding applications which require excellent processability. The unusually low melt viscosities of the blends are most apparent at the higher shear rates. These high shear rates most closely simulate the shear rates experienced by the polymer during injection molding.

TABLE 1

Melt Viscosities in Poise of PETG/NAS Blends as a Function of Shear Rate in (1/sec) at 245° C.

| Shear Rate | PETG 6763 | 50% PETG, 50% NAS-10 | NAS-10 |
| --- | --- | --- | --- |
| 150 | 10400 | 6230 | 5430 |
| 450 | 7620 | 3050 | 2810 |
| 1500 | 3950 | 1260 | 1140 |
| 3000 | | 749 | 677 |
| | | 50% PETG, 50% NAS-21 | NAS-21 |
| 150 | 10400 | 5160 | 4270 |
| 450 | 7620 | 2970 | 2360 |
| 1500 | 3950 | 1260 | 1010 |
| 3000 | | 744 | 623 |
| | | 50% PETG, 50% NAS-30 | NAS-30 |
| 150 | 10400 | 5370 | 4470 |
| 450 | 7620 | 3120 | 2370 |
| 1500 | 3950 | 1390 | 1050 |
| 3000 | | 801 | 632 |

TABLE 2

Melt Viscosities in Poise of PETG/NAS-21 Blends as a Function of Shear Rate in (1/sec) at 245° C.

| Shear Rate | PETG 6763 | 75% PETG, 25% NAS-21 | 50% PETG, 50% NAS-21 | 25% PETG, 75% NAS-21 | NAS-21 |
| --- | --- | --- | --- | --- | --- |
| 150 | 13000 | 8300 | 6410 | 5640 | 5310 |
| 450 | 9760 | 4850 | 3580 | 3160 | 2690 |
| 1500 | 4670 | 2080 | 1550 | 1330 | 1660 |
| 3000 | | 1250 | 944 | 808 | 688 |

TABLE 3

Melt Viscosities in Poise of PCTG/NAS Blends as a Function of Shear Rate in (1/sec) at 275° C.

| Shear Rate | PCTG 5445 | 50% PCTG, 50% NAS-10 | NAS-10 |
| --- | --- | --- | --- |
| 150 | 3240 | 31.40 | 3510 |
| 450 | 2990 | 1970 | 1820 |
| 1500 | 2250 | 856 | 812 |
| 3000 | | 545 | 487 |
| | | 50% PCTG, 50% NAS-21 | NAS-21 |
| 150 | 3240 | 2130 | 2340 |
| 450 | 2990 | 1550 | 1350 |
| 1500 | 2250 | 843 | 661 |
| 3000 | | 542 | 400 |
| | | 50% PCTG, 50% NAS-30 | NAS-30 |
| 150 | 3240 | 2390 | 2390 |
| 450 | 2990 | 1650 | 1500 |
| 1500 | 2250 | 918 | 716 |
| 3000 | | 583 | 445 |

TABLE 4

Melt Viscosities in Poise of PCTG/NAS-30 Blends as a Function of Shear Rate in (1/sec) at 275° C.

| Shear Rate | PCTG 5445 | 75% PCTG, 25% NAS-30 | 50% PCTG, 50% NAS-30 | 25% PETG, 75% NAS-30 | NAS-30 |
| --- | --- | --- | --- | --- | --- |
| 150 | 4980 | 3460 | 2710 | 2760 | 2710 |
| 450 | 4610 | 2890 | 1880 | 1700 | 1720 |
| 1500 | 3070 | 1450 | 1010 | 847 | 819 |
| 3000 | | 947 | 631 | 555 | 511 |

TABLE 5

Physical Properties of Copolyester/NAS Copolymer Blends

| | Heat Deflection at 66 psi | Temperatures C. at 264 psi | Flexural Modulus 100,000 psi |
| --- | --- | --- | --- |
| PETG 6763 | 69 | 64 | 3.10 |
| 75% PETG, 25% NAS-21 | 75 | 68 | 3.69 |
| 50% PETG, 50% NAS-21 | 84 | 71 | 4.15 |
| 25% PETG, 75% NAS-21 | 91 | 80 | 4.75 |

TABLE 5-continued

Physical Properties of Copolyester/NAS Copolymer Blends

|  | Heat Deflection at 66 psi | Temperatures C. at 264 psi | Flexural Modulus 100,000 psi |
|---|---|---|---|
| NAS-21 | 89 | 77 | 5.44 |
| PCTG 5445 | 74 | 68 | 2.71 |
| 75% PCTG, 25% NAS-30 | 79 | 69 | 3.34 |
| 50% PCTG, 50% NAS-30 | 80 | 75 | 3.91 |
| 25% PCTG, 75% NAS-30 | 87 | 77 | 4.37 |
| NAS-30 | 89 | 77 | 5.41 |

The invention has been described in detail with particular reference to preferred embodiments thereof, but it will be understood that variations and modifications can be effected within the spirit and scope of the invention. Moreover, all patents, patent applications (published or unpublished, foreign or domestic), literature references or other publications noted above are incorporated herein by reference for any disclosure pertinent to the practice of this invention.

We claim:

1. An injection molding composition having a melt viscosity lower than about 2000 poise at 1500/sec. shear rate at a temperature of about 275° C., and an excellent stiffness of at least 200,000 psi, comprising:

from about 10 to about 90% of a polyester comprising repeat units from terephthalic acid, ethylene glycol, and 1,4-cyclohexanedimethanol, and from about 10 to about 90% styrene copolymer consisting of repeat units of styrene and from about 5 to about 35 mole percent of methyl methacrylate.

2. The composition of claim 1 wherein the glycol compound is from about 15 to about 85 mole percent of ethylene glycol and from about 15 to about 85 mole percent of cyclohexanedimethanol.

3. The composition of claim 1 wherein the inherent viscosity of the polyester is from about 0.5 to about 1.0 dl/g.

4. The composition of claim 1 wherein the inherent viscosity of the polyester is from about 0.7 to about 0.8 dl/g.

5. The composition of claim 1 wherein the polyester is copoly (25-35/75-65 1,4-cyclohexylenedimethylene/ethylene terephthalate.

6. The composition of claim 1 wherein the polyester is copoly (58-68/42-32 1,4-cyclohexylenedimethylene/ethylene terephthalate.

* * * * *